Patented Dec. 28, 1937

2,104,000

UNITED STATES PATENT OFFICE 2,104,000

PRODUCTION OF POLYMERIZATION PRODUCTS FROM VINYL ETHERS

Walter Reppe and Otto Schlichting, Ludwigshafen-on-the-Rhine, Germany, assignors to I. G. Farbenindustrie Aktiengesellschaft, Frankfort-on-the-Main, Germany No Drawing. Application November 9, 1931, Serial No. 574,040. In Germany June 27, 1929

11 Claims. (Cl. 260—2)

The present invention relates to the production of polymerization products from vinyl ethers.

We have found that polymerization products are obtained in an advantageous manner from vinyl ethers having the general formula

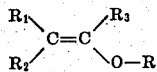

in which R is an aliphatic, aromatic or hydroaromatic radicle, and $R_1$, $R_2$ and $R_3$ are hydrogen atoms or aliphatic radicles, by contacting the said vinyl ethers singly, or in admixture with each other, with practically anhydrous inorganic acid reacting condensing agents, as for example tin tetrachloride, stannous chloride, aluminium chloride or sulphate, iron chloride, zinc chloride, boron fluoride, boron hydrogen fluoride, silicon tetrachloride, mercury chloride, sodium bisulphate, potassium bisulphate, alum, sulphuric acid, phosphoric acid, hydrochloric acid or hydrofluoric acid. The quantities of the condensing agents employed are generally between 0.001 and 5 per cent of the weight of the vinyl ether employed but even very small amounts, as for example from 0.001 to 0.5 per cent, of the weight of the vinyl ether employed, of the condensing agents are sufficient in most cases to effect the polymerization. The initial vinyl ethers may be chosen for example from the alkyl, cycloalkyl or aryl ethers of vinyl alcohols, such as methyl-, ethyl-, propyl-, butyl-, hexyl- or cyclohexyl, vinyl, propenyl or iso-propenyl ethers and also from the vinyl or alkyl-vinyl ethers of long-chain alcohols containing at least 5 carbon atoms, such as alcohols corresponding to the acids containing up to say 35 carbon atoms, especially of animal and vegetable fats and waxes, such as octyl, decyl, dodecyl, tetradecyl, docosanyl or octodecyl alcohols, vinyl ethers of montanol and phenyl, α- or β-naphthyl or cresyl vinyl ethers, as well as mono- and di-vinyl ethers of the glycols and poly-alkylene glycols, as for example of di-, tri- or tetraethylene or -propylene glycols and of higher glycols, such as of octodecandiol. Besides these vinyl ethers of glycols the vinyl ethers of the mono-alkyl or aryl ethers of glycols may be employed as for example the vinyl ethers of ethylene, or propylene, glycol mono-methyl, -ethyl, -butyl, -phenyl or -cresyl ethers, and the corresponding mono-alkyl or aryl ethers of di- or tri-ethylene, or propylene glycols. Specific compounds of these series are for example di- or tri-ethylene glycol mono-vinyl ethers, di- or tri-ethylene glycol di-vinyl ethers and the corresponding vinyl ethers of 1.2-di- or tri-propylene glycols, as well as di-vinyl ether and the di-vinyl ethers of higher glycols as for example of octodecandiol.

The polymerization may be carried out with especial advantage by employing the said acid reacting condensing agents deposited or adsorbed on adsorptive materials. When employing polymerizing agents of this kind it is not only possible to polymerize any desired large amount of vinyl ether without the danger of an undue rise of temperature, but it is also possible to separate readily the polymerizing agent employed, which is of great advantage, and, in particular the polymerization temperature can be lowered in this way. As adsorptive substances may be mentioned especially adsorptive hydrosilicates, as for example Florida earth and the adsorptive hydrosilicates obtainable in commerce as bleaching earths under the trade names Tonsil, Granosil, Terrana, Isarit or under the registered trademark Frankonit, and also, active carbon, kieselguhr, pumice, precipitated silica (silicon substratum) or silica gel. Bleaching earths having an acid reaction, i. e., those the aqueous extract of which has a pH value of less than 7, as for example the Bavarian bleaching earths obtainable in commerce under the trade names Tonsil HC, Tonsil AC and Granosil, which possess a small content of mineral acid from their production or purification are especially suitable and may be used as such without further impregnation with acid condensing agents.

The polymerization may be carried out in the liquid or, with solid condensing agents or condensing agents solidified by deposition on solid carriers, in the gaseous phase. The reaction in the gaseous phase may be effected with the employment of inert gaseous diluents such as carbon dioxide, nitrogen, methane or carbon monoxide. On working in the liquid phase it is preferable to add the condensing agents to the vinyl ethers in small portions, care being taken by cooling for the withdrawal of the heat of reaction. The polymerization proceeds very rapidly especially with strongly acid reacting condensing agents. The polymerization products obtainable are almost colourless or pale yellow to brown products having consistencies ranging from those of viscous liquids to balsams or soft resins and waxes which dissolve in the usual organic solvents. Also the liquid phase reaction may be carried out in order to render it less vigorous, in the presence of inert organic diluents as for example liquid or liquefied aliphatic or aromatic hydrocarbons, such as benzene, toluene, xylene, decahydronaphthalene, saturated ethers, such as diethyl ether, ethyl n-butyl ether, di-n-butyl ether or ethyl propyl ether and aliphatic liquid hydrocarbons, such as benzine or like mineral oil fractions, or acetone or esters such as butyl or ethyl acetates.

When carrying out the polymerization it is most advantageous to proceed by first diluting only a small part of the vinyl ether with the solvent, the condensing agent then being added while stirring. The remainder of the vinyl ether is then caused to flow in gradually, care being taken by suitable cooling that the temperature does not unduly rise, the reaction being generally carried out at from 10° to 120° C., preferably between about 20° and 100° C. When the whole of the vinyl ether has been introduced, the reaction solution may be heated under a reflux condenser for some time in order to complete the polymerization. The polymerization products obtained after distilling off the solvents employed are almost the same as the products obtained without solvents. The resinous products left behind after the distillation may be taken up, for example in ethyl ether or benzene, and recovered in a pure form after distilling off the solvent employed. As already mentioned mixtures of different vinyl ethers may be polymerized, the addition of a small amount of one vinyl ether to a large quantity of another providing a considerable alteration in the properties of a polymerization product obtainable by polymerizing singly the vinyl ether used in preponderating quantity in the mixture as regards mechanical strength and solubility.

On working with solid condensing agents deposited on adsorptive materials it is preferable to work by introducing the vinyl ether to be polymerized in the gaseous or liquid state at the top of a vertical vessel, capable of being heated and cooled, which is charged with the adsorptive substance serving as the polymerizing agent, preferably in small quantities mixed with inert filler bodies, such as balls or rings of glass, clay and like inert materials. The polymerization product may be withdrawn from the lower end of the vessel. For the purpose of obtaining a better withdrawal of the reaction heat, especially in the case of the lower members of the series (vinyl methyl ether and vinyl ethyl ether), it is advantageous to work so that the polymerization proceeds incompletely for example by increasing the throughput or adding gaseous inert diluents; in this manner adjustable quantities of vinyl ether leave the reaction space unaltered. The gaseous unchanged vinyl ether leaving the lower end of the vessel together with the polymerization product may be returned to the vessel again, if necessary after liquefaction, or re-evaporation.

Generally speaking, a more or less vigorous polymerization commences when the vinyl ether is added to the condensing agents deposited on adsorptive substances even at room temperature. When employing less active e. g. very weakly acid condensing agents, as for example Frankonit S, a slight warming to, say, 40° C. is of advantage. If the reaction be carried out in the liquid phase in the presence of a liquid diluent, the reaction temperature may be raised to the boiling point of the diluent; in this case the vinyl ether to be polymerized is advantageously gradually added to the diluent which is kept boiling and contains the polymerizing agent suspended therein. On working in the vaporous phase temperatures up to 250° C. may be applied but the reaction is preferably carried out also in this case at a temperature of from 40° to 100° C. in the reaction space.

The resulting polymerization products are more or less viscous liquid, or solid, saturated substances depending on the nature of the ether employed and on the degree of polymerization and are stable to dilute aqueous acids and alkalies. They may be employed, for coating and adhesive purposes, as substitutes for oils in oil-filled subsoil or submarine cables and as resins in the production of artificial masses; products from high molecular vinyl ethers may be employed as substitutes for the last waxes of natural origin. The products may also be applied as intermediate layers for compound glass; they can be further employed as softening and plasticizing agents for India rubber and rubber-like polymerization products of diolefines such as butadiene or isoprene, or for masses from polymerized styrene.

The vinyl ethers, especially in large amounts, can be polymerized particularly rapidly but without danger of an undue rise of temperature by employing boron halides and boron halide hydrogen halides as for example boron fluoride, chloride or bromide, or boron hydrogen fluoride, in the form of their addition or conversion products with organic oxygen bearing compounds as for example ethers, such as diethyl or dibutyl ether, ketones or alcohols (see Gmelin's "Handbuch der anorganischen Chemie", 8th edition, volume Boron, page 114 et seq.) as the condensing agents.

For the purpose of accurate dosing of the condensing agent, the addition or conversion products of the boron halides are advantageously employed only in very dilute solutions, as for example about 2 per cent solutions. The alcohols or ethers employed for the preparation of the said addition products may be employed as solvents for the said compounds. The amounts of boron halide addition products necessary for the polymerization are extremely small and frequently amount to only about 0.001 per cent of the vinyl ether to be polymerized. Thus for example for the polymerization of a litre of vinyl n-butyl ether, only about 1 cubic centimetre of a 2 per cent solution of the addition product of boron fluoride with di-n-butyl ether (which can be prepared by introducing a current of boron fluoride into an equimolecular proportion of di-n-butyl ether at about 10° C.) in di-n-butyl ether is necessary. Also this polymerization of the vinyl ethers may be carried out in the presence of a solvent for the vinyl ether, as for example in the presence of saturated ethers or of hydrocarbons of the aliphatic, hydroaromatic or aromatic series, but an advantage of this modification is that substantial quantities of solvents for the vinyl ether are not necessary.

The properties of the polymerization products obtainable in this manner are very similar to those of the products obtained as hereinbefore described by means of the other said acid condensing agents; they may, however, be obtained in an entirely colourless form. As the last traces of the vinyl ether are only polymerized with difficulty, the products first obtained are in some cases still unsaturated to a slight extent. After being allowed to stand for some time or after removing the last traces of non-polymerized vinyl ether in vacuo, the polymerization products become quite inert to bromine. Any small amounts of boron halide addition products which may be present are readily removed by treating the polymerization products with steam and then drying them.

The most satisfactory temperatures for the polymerization of the vinyl ethers when employing addition products of boron halides lie between about 40° and 60° C. The polymerization may be carried out, however, at the lower or higher temperatures already mentioned. The polymerization may be effected in open vessels provided with reflux condensers or in closed vessels under pressure.

Part of the lower members of the new polymerized ethers according to the present invention is soluble in water as for example the polymeric vinyl methyl ether, the vinyl ether of diethylene glycol mono-ethyl ether and the vinyl ether of ethylene glycol mono-ethyl ether, the first mentioned compound preferably, however, with the conjoint employment of a dissolution assistant such as methyl or ethyl alcohols or ethylene glycol mono-methyl ether; these compounds may find useful application in sizing or dressing. The higher members, such as the polymeric octodecyl vinyl ether, are white, waxy bodies which are generally easily soluble in gasoline, benzene, turpentine oil and like solvents for waxes.

The following examples will further illustrate how this invention may be carried out in practice but the invention is not restricted to these examples. The parts are by weight.

*Example 1*

0.25 part of stannous chloride is added to 50 parts of vinyl-n-butyl ether (CH$_2$=CH—O—C$_4$H$_9$, which may be prepared by heating anhydrous n-butanol with vinyl chloride at 100° C. in an autoclave in the presence of metallic sodium) in a reaction vessel provided with a wide reflux condenser. After a few minutes the temperature begins to rise and at a temperature of about 45° to 50° C. sudden boiling with a consequent rapid rise in temperature to 140° C. takes place. The reaction product is a yellowish brown balsam-like mass which is purified by steam distillation. 35 parts of a viscous liquid yellow polymerization product are obtained.

Tin tetrachloride or aluminium chloride may be employed instead of stannous chloride.

*Example 2*

1 part of aluminium chloride is suspended in 200 parts of dry benzene and then 200 parts of vinyl ethyl ether (CH$_2$=CH—O—C$_2$H$_5$) are added to the suspension while stirring. About 20 parts of the vinyl ether are added at once in order to start the reaction, the remainder being added a little at a time. The occurrence of turbidity indicates the commencement of the polymerization. When the temperature has risen to from 60° to 80° C. the vinyl ether is added in portions of from 1 to 2 parts, whereby the fact that the reaction is taking place may be detected not only by a rise in temperature but also by a brown colouration of the mass which disappears after the reaction. When the colouration has disappeared, further amounts of vinyl ether are added, and this procedure is repeated. When all the vinyl ether has been introduced, the whole is stirred for an hour at 80° C. The volatile constituents are distilled off from the resulting mixture with steam and the residue is taken up with ethyl ether. After drying and distilling off the ether, 144 parts of a yellow balsam-like product are obtained.

*Example 3*

20 parts of ethyl-n-propenyl ether (CH$_3$—CH=CH—O—C$_2$H$_5$)

are gradually introduced into a mixture of 1 part of tin tetrachloride and 80 parts of benzene. The temperature rises to the boiling point of the benzene and the reaction mixture assumes a brown colour. When the whole of the ether has been introduced, the benzene and volatile constituents are expelled with steam. The residue is taken up with ether, and the ethereal solution is shaken up with animal charcoal and filtered. After distilling off the ether, a brownish yellow, soft resin remains behind.

*Example 4*

1 part of aluminium chloride is suspended in 150 parts of benzene, 50 parts of ethyl-isopropenyl ether

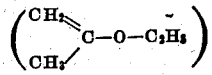

are allowed to drop slowly into the suspension. The temperature rises to the boiling point of the benzene and the reaction mixture assumes a brownish red colour. After distilling off the benzene and volatile constituents with steam, a brown, very sticky mass resembling a vegetable balsam remains behind, the behaviour of which towards solvents is generally speaking the same as the polymerization product obtained from vinyl ethyl ether.

*Example 5*

14 parts of vinyl ortho-cresyl ether

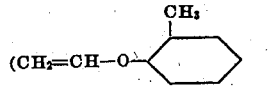

which may be prepared by heating sodium ortho-cresolate with vinyl chloride in the presence of ethyl alcohol to 180° C. in an autoclave) are allowed to drop gradually into a suspension of 0.3 part of aluminium chloride in 40 parts of benzene, whereby the polymerization commences with the evolution of much heat and the formation of a red colouration. The diluent and the volatile constituents are distilled off with steam and, after cooling, the water is poured off from the residue. The reaction product is a violet coloured brittle resin which is soluble in ethyl ether, acetone, 96 per cent ethyl alcohol, butyl acetate and hydrocarbons of the benzene series but which is scarcely soluble in benzine.

If vinyl phenyl ether be employed instead of vinyl ortho-cresyl ether, a solid red polymerization product is obtained which is soluble only with difficulty in the said solvents with the exception of acetone in which it dissolves readily.

*Example 6*

50 parts of vinyl meta-cresyl ether

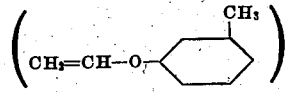

are allowed to stand at room temperature after the addition of 5 parts of zinc chloride. After having been allowed to stand for 2 days, the original readily mobile liquid has been converted into a colourless, balsam-like, very sticky resin. The polymerization product is readily soluble in ethyl ether, acetone, butyl acetate and benzene but difficultly soluble in ethyl alcohol and benzine.

If the polymerization be carried out at higher temperatures, as for example at from 80° to 95° C. a polymerization of the same intensity is attained after from 1 to 2 hours; the resulting product has a slightly greenish shade, however.

*Example 7*

100 parts of vinyl ethyl ether are introduced into a vessel provided with an efficient stirring device, a cooling jacket and a reflux condenser. The ether is warmed to 35° C. and 0.5 part of a 2 per cent solution of the addition product of boron fluoride and di-n-butyl ether (which boils at 160° C.) in di-n-butyl ether is added. 2000 parts of vinyl ethyl ether are allowed to flow in at from 40° to 50° C. during the course of 2 hours while a further 3.5 parts of the said solution of the addition product of boron fluoride and di-n-butyl ether are gradually added at the same time. The resulting colourless, viscous liquid polymerization product is freed from the last traces of non-polymerized vinyl ether at about 50° C. in vacuo. The final product is quite stable to bromine.

*Example 8*

100 parts of vinyl-n-butyl ether are introduced into the stirring vessel described in Example 7 and, after warming to 40° C., 0.5 part of a 2 per cent solution of the addition product of boron fluoride and di-ethyl ether in di-ethyl ether is added. The temperature of the polymerization which soon commences is kept at about 40° to 50° C. partly by cooling and partly by the addition of further amounts of vinyl n-butyl ether cooled to a temperature of 15° C. In this manner about 2000 parts of vinyl butyl ether and a further 3.5 parts of the solution of the boron fluoride addition product are added in the course of 2 hours. After stirring for about a further 2 hours, the polymerization is practically completed. The last traces of non-polymerized vinyl butyl ether are polymerized after allowing the reaction mixture to stand for several days at room temperature or slightly elevated temperatures, as for example about 40° C. A colourless, honey-like highly viscous and sticky product is obtained.

In the same manner vinyl cyclohexyl ether may be polymerized by substituting the aforesaid quantity of vinyl butyl ether by the same quantity of the cyclohexyl ether.

*Example 9*

100 parts of vinyl methyl ether and 1 part of the solution of the boron fluoride addition product employed in Example 7 are introduced into the vessel described in Example 7, the reflux condenser of which is kept at from —5° to 0° C., and heated to boiling. As the polymerization proceeds, the temperature of the contents of the vessel gradually rises from 9° C. (the boiling point of vinyl methyl ether) to about 20° C. 1000 parts of vinyl methyl ether are then added at about 20° C. during the course of 4 hours while 1 part of the solution of the said polymerizing agent is gradually added at the same time. The contents of the vessel are then heated to 30° C. until a sample withdrawn and dissolved in cyclohexane only absorbs small amounts of bromine. Remainders of non-polymerized vinyl methyl ether are removed from the polymerization product by distillation in vacuo at about 200 millimetres of mercury.

The resulting polymerization product is easily soluble in organic solvents such as aliphatic alcohols, ketones, esters or acids and in hydrocarbons and is miscible with water in any desired proportion. In the latter case it is, however, advantageous to employ a dissolution assistant such as methyl or ethyl alcohols, ethylene glycol monomethyl or ethyl ethers. Viscous mixtures of equal parts of the polymerization product with the dissolution assistants can be diluted with water in any proportion with the formation of clear solutions.

Almost the same polymerization product is obtained by heating vinyl methyl ether and the said polymerizing agent to about 60° C. in an autoclave for from about 4 to 6 hours.

*Example 10*

200 parts of vinyl octodecyl ether $$CH_2=CH-O-C_{18}H_{37}$$

obtainable from octodecyl alcohol and acetylene at from about 160° to 180° C. in the presence of a small quantity of caustic potash, are fused in a stirring vessel. 0.6 part of the solution of polymerizing agent specified in Example 7 is added, at 50° C. and the vigorous reaction which immediately commences is kept at a temperature of from 50° to 60° C. by cooling. 2000 parts of vinyl octodecyl ether together with 2.5 parts of the said solution of the polymerizing agent are gradually added during the course of 3 hours. The resulting saturated, solid polymerization product melts at 55° C. and resembles in its appearance colourless translucent paraffin wax.

In the same manner octyl, decyl, dodecyl and tetradecyl ethers of vinyl alcohol as well as the vinyl ethers of oleic alcohol and of the alcohols corresponding to the acids of Montan wax can be polymerized. If desired, a 2 per cent solution of boron fluoride in acetic acid may be employed as polymerizing agent.

*Example 11*

10 parts of octodecan-diol divinyl ether $(C_{18}H_{36}(O-CH=CH_2)_2)$, obtainable by acting with acetylene at a temperature of from 160° to 180° C. in the presence of 2 per cent of caustic potash on octodocan-diol (obtainable by catalytic hydrogenation of castor oil at a temperature of from 230° to 250° C. under a pressure of hydrogen of about 100 atmospheres), are dissolved in 800 parts of vinyl ethyl ether.

100 parts of the solution obtained are introduced into an enamelled vessel provided with an efficient stirring device, a cooling jacket and a reflux condenser. The solution is warmed to boiling (about 36° C.) and 0.6 part of a 1 per cent solution of the addition product of boron fluoride and di-n-butyl ether in di-n-butyl ether is added. The vigorous reaction is kept moderate by cooling to 40° C. The residual 710 parts of the solution are allowed to flow in during the course of 2 hours while a further 2.4 parts of the said solution of the addition product of boron fluoride and di-n-butyl ether are gradually added at the same time. Remainders of non-polymerized vinyl butyl ether, if such be still present, are removed by distillation in vacuo at about 100 millimetres of mercury.

The polymerization product obtained is very tenacious and stringy and resembles synthetic rubber; in contrast to the product obtained according to Example 7 it is insoluble in organic solvents such as aliphatic, cyclo-aliphatic and aromatic hydrocarbons, as for example benzine, cyclohexane, benzene, ethyl alcohol or acetone, but swells therein.

Example 12

An internally enamelled vertically arranged tubular reaction vessel having a sheet metal jacket capable of being heated, is filled with glass beads of about 1 centimetre diameter to each litre of which 50 cubic centimetres of the bleaching earth obtainable in commerce under the trade name "Granosil" are uniformly added. The temperature in the vessel is kept at about 70° C. by means of hot water circulating in the heating jacket. The supply pipe from a storage vessel for vinyl ether and an outlet pipe are led through the closure at the upper end of the vessel. Non-polymerized vaporous vinyl ethyl ether escapes through the said outlet, is liquefied in a condenser arranged above the said storage vessel and is supplied to the said vessel again. The heat of polymerization of the vinyl ether is to a large extent withdrawn by the heat required for evaporating the non-polymerized fraction of the vinyl ether. A vessel for collecting the polymerization product is arranged in an airtight manner at the bottom of the reaction vessel. About 500 grams of liquid vinyl ethyl ether per hour and per litre of reaction space are supplied to the reaction chamber from the storage vessel; about 150 grams of polymerization product are obtained while the non-polymerized vinyl ethyl ether passes back into the storage vessel again by way of the condenser. The resulting polymerization product, which generally still contains small amounts of non-polymerized ether dissolved therein, becomes quite inert to bromine after standing for some time. If a further purification be desired, the polymerization product may be redissolved in a suitable solvent, such as benzene or cyclohexane.

A similar result is obtained when gaseous vinyl ethyl ether is introduced, the polymerization product and the non-polymerized vinyl ethyl ether are withdrawn from the lower end of the tube and the non-polymerized vinyl ethyl ether is separated and led in again in the vapour phase.

Example 13

About 100 grams per hour and per litre of reaction space of vinyl-n-butyl ether are allowed to flow at about 70° C. into the reaction vessel filled with "Granosil" and glass beads as described in Example 12. The polymerized vinyl butyl ether is withdrawn from the lower end of the reaction vessel and becomes quite stable to bromine after standing for some time.

Example 14

5 parts of the divinyl ether of octodecandiol are dissolved in 1000 parts of benzene or benzine and 0.5 part of a 1 per cent solution of boron fluoride in di-n-butyl ether are added. The reaction mixture grows warm and viscous and solidifies to a solid jelly, from which the benzene or benzine can be removed by pressing. A similar product can be obtained from the divinyl ether of triethylene glycol

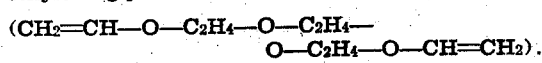

Example 15

0.6 part of a 2 per cent solution of the double compound of boron fluoride and di-butyl ether in di-butyl ether is added at 40° C. to 100 parts of the vinyl ether of diethylene glycol mono-ethyl ether

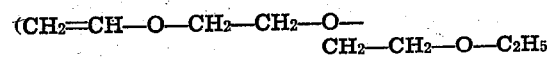

obtainable by acting with acetylene on diethylene glycol mono-ethyl ether in the presence of 2 per cent, by weight of the latter, of anhydrous caustic potash) in a stirring vessel. In the course of about 1 hour 900 parts of the aforesaid vinyl ether are slowly introduced while stirring and keeping the temperature at from 40° to 50° C. by cooling. The reaction mixture is then stirred at the said temperature until the product does not react with bromine any more which effect is usually attained after from 3 to 4 hours. The resulting colourless and highly viscous polymerization product is miscible with water in any proportion.

Example 16

0.05 part of a 2 per cent solution of the double compound of boron fluoride and di-butyl ether in di-butyl ether is added to 5 parts of di-vinyl ether ($CH_2=CH—O—CH=CH_2$). With a slight evolution of heat the whole solidifies to a solid, brittle mass.

What we claim is:—

1. The process for the polymerization of vinyl ethers, corresponding to the general formula

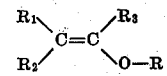

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$, $R_2$ and $R_3$ denote hydrogen or alkyl radicles, which comprises contacting the said ethers with a small amount of an inorganic, practically anhydrous acid reacting condensing agent.

2. The process for the polymerization of vinyl ethers, corresponding to the general formula

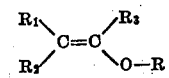

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$, $R_2$ and $R_3$ denote hydrogen or alkyl radicles, which comprises contacting the said ethers with from 0.001 to 5 per cent of their weight of an inorganic acid reacting condensing agent.

3. The process for the polymerization of vinyl ethers, corresponding to the general formula

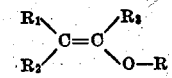

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$, $R_2$ and $R_3$ denote hydrogen or alkyl radicles, which comprises contacting the said ethers with from 0.001 to 5 per cent of their weight of an inorganic acid reacting condensing agent at a temperature between 10° and 250° C.

4. The process for the polymerization of vinyl ethers, corresponding to the general formula

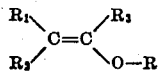

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$ $R_2$ and $R_3$ denote hydrogen or alkyl radicles, which comprises contacting the said ethers with from 0.001 to 5 per cent of their weight of an inorganic acid reacting condensing agent at a temperature between 10° and 120° C.

5. The process for the polymerization of vinyl ethers, corresponding to the general formula

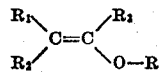

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycoalkyl and monoaryl ethers thereof and $R_1$, $R_2$ and $R_3$ denote hydrogen or alkyl radicles, which comprises contacting the said ethers in the liquid phase with a small amount of an inorganic acid reacting condensing agent.

6. The process for the polymerization of vinyl ethers, corresponding to the general formula

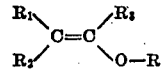

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$ $R_2$ and $R_3$ denote hydrogen or alkyl radicles, which comprises contacting the said ethers in the liquid phase and in the presence of an inert diluent with a small amount of an inorganic acid reacting condensing agent.

7. The process for the polymerization of vinyl ethers, corresponding to the general formula

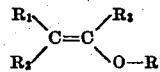

in which R denotes a radical selected from the group consisting of aliphatic, aromatic or hydroaromatic hydrocarbon radicals and the radicals of the glycols and polyglycols and the monovinyl, monovinylalkyl, monoalkyl, monocycloalkyl and monoaryl ethers thereof and $R_1$, $R_2$ and $R_3$ denote hydrogen or alkyl radicals, which comprises contacting the said ethers in the vaporous state with a small amount of an inorganic solid acid reacting condensing agent at a temperature up to 250° C.

8. As a new article of manufacture, a polymeric vinyl octodecyl ether which is practically inert to bromine.

9. Articles of manufacture consisting essentially of polymeric vinyl alkyl ethers which are viscous liquid to solid saturated substances, stable to dilute aqueous acids and alkalis, and practically inert to bromine.

10. Articles of manufacture essentially comprising polymeric vinyl ethers which are viscous liquid to solid saturated substances, stable to dilute aqueous acids and alkalis, being the polymerization products of mixtures of different monomeric ethers, and practically inert to bromine.

11. A polymeric vinyl methyl ether which is a viscous liquid to solid saturated substance stable to dilute aqueous acids and alkalis, and practically inert to bromine.

WALTER REPPE.
OTTO SCHLICHTING.